United States Patent
Konno et al.

(10) Patent No.: US 7,932,681 B2
(45) Date of Patent: Apr. 26, 2011

(54) LED LIGHTING DEVICE AND LCD DEVICE USING THE SAME

(75) Inventors: Akitoyo Konno, Hitachi (JP);
Tsunenori Yamamoto, Hitachi (JP);
Tatsuki Inuzuka, Mito (JP)

(73) Assignee: Hitachi Displays, Ltd., Chiba (JP)

( * ) Notice: Subject to any disclaimer, the term of this patent is extended or adjusted under 35 U.S.C. 154(b) by 32 days.

(21) Appl. No.: 12/418,853

(22) Filed: Apr. 6, 2009

(65) Prior Publication Data

US 2009/0190065 A1    Jul. 30, 2009

Related U.S. Application Data

(62) Division of application No. 11/654,664, filed on Jan. 18, 2007, now Pat. No. 7,518,319.

(30) Foreign Application Priority Data

Mar. 9, 2006 (JP) .................................. 2006-063486

(51) Int. Cl.
*G05F 1/00* (2006.01)
(52) U.S. Cl. ........ 315/291; 315/247; 315/224; 315/274; 315/312
(58) Field of Classification Search .................. 315/247, 315/246, 291, 307–326, 185 S
See application file for complete search history.

(56) References Cited

U.S. PATENT DOCUMENTS

| 6,351,079 | B1 | 2/2002 | Willis | |
| 6,888,529 | B2 | 5/2005 | Bruning | |
| 7,642,725 | B2* | 1/2010 | Cusinato et al. | 315/185 S |
| 2004/0212310 | A1 | 10/2004 | Ito | |
| 2005/0151717 | A1 | 7/2005 | Seo | |
| 2006/0125773 | A1 | 6/2006 | Ichikawa | |
| 2006/0186827 | A1* | 8/2006 | Ragonesi et al. | 315/185 S |
| 2006/0238466 | A1 | 10/2006 | Chen | |

FOREIGN PATENT DOCUMENTS

| JP | 2002-008409 | 1/2002 |
| JP | 2004-199896 | 7/2004 |
| JP | 2005-310997 | 11/2005 |
| JP | 2007-165832 | 6/2007 |

* cited by examiner

*Primary Examiner* — Tuyet Thi Vo
(74) *Attorney, Agent, or Firm* — Antonelli, Terry, Stout & Kraus, LLP.

(57) ABSTRACT

A lighting device includes at least two lines connected in parallel, a constant current source for applying a constant current to at least one of the at least two lines, an ON/OFF controller, and a voltage detector for measuring a value of voltage flowing in each line of the at least two lines. Each line of the at least two lines is formed by one or more light-emitting diodes and a switch for turning ON/OFF the current flowing in the light-emitting diodes connected in series, and according to the voltage value of each line of the at least two lines measured by the voltage detector, the ON/OFF controller controls the duty ratio of the one or more light-emitting diodes of each line in accordance with the voltage measured.

6 Claims, 13 Drawing Sheets

CURRENT MEASUREMENT PERIOD

LAMP LIGHT EMITTING PERIOD

1 CYCLE (16.6 ms)

LAMP LIGHT EMITTING PERIOD

LIGHT EMISSION DUTY (%) = on PERIOD / LAMP LIGHT EMISSION PERIOD × 100 (%)

LED LIGHTING DEVICE AND LCD DEVICE USING THE SAME

CROSS REFERENCE TO RELATED APPLICATION

This application is a divisional application of U.S. application Ser. No. 11/654,664, filed Jan. 18, 2007, now U.S. Pat. No. 7,518,319, the contents of which are incorporated herein by reference.

BACKGROUND OF THE INVENTION

The present invention relates to an LED lighting device drive circuit and an image display device using the same.

Recently, with increase of the light emission efficiency, the light emitting diode (LED) is employed for a lighting device more and more. Especially the LED is tried to be employed for a backlight arranged at the rear surface of a liquid crystal display (LCD) device. As a display method of the liquid crystal display device, in addition to the TN (twisted nematic) as a mainstream, an IPS (in-plane switching) and an MVA (multi-domain vertical alignment) characterized by a wide visual angle are used. These devices form an image by introducing the light of the lighting device arranged on the rear surface of the display unit into a liquid crystal panel capable of controlling the transmittance of the light. As a light source of the lighting device, in addition to the LED, it is possible to use a cold cathode fluorescent light (CCFL), a hot cathode fluorescent light (HCFL), an organic light emitting diode (OLED), and the like. The LED has a high color purity and can increase the color reproduction range of the liquid crystal display device. Moreover, since no lead is used, it is appropriate for the environment. Furthermore, since the LED has a high-speed response, it is possible to easily perform modulation with a light emission time width, which easily reduces power consumption.

The lighting device as a liquid crystal display device should have a characteristic that the brightness and color will not change. However, the LED has a characteristic that the light emission efficiency changes depending on the temperature and its brightness is changed by the affect of self-heating during ON state. Accordingly, the LED requires a compensation technique so that the brightness and the color will not be changed by the temperature change.

JP-A-2005-310997 discloses a technique for compensating the fluctuation of the brightness of the LED as the time elapses. That is, a photo sensor is divided to detect an emitted light quantity of each LED and feedback is performed on the LED drive condition so as to prevent the brightness change of the LED.

Moreover, JP-A-2004-199896 discloses a technique for arranging a temperature sensor in the vicinity of the LED so as to detect the LED temperature state and performing feedback on the LED drive condition.

Recently, however, a large-screen liquid crystal television exceeding 32 inches is spread. In order to realize this, it is necessary to arrange a plenty of LEDs substantially uniformly in the wide area. For this, it is difficult to compensate the brightness fluctuations of the plenty of LEDs by the techniques disclosed in the aforementioned JP-A-2005-310997 and the JP-A-2004-199896.

For example, in the compensation technique using a photo sensor, when a plenty of light sources are used, the positional relationship between the light source and the photo sensor differs among the light sources and the light quantity received by the photo sensor differs depending on the respective light sources. Accordingly, it is necessary to prepare a compensation table for compensating the positional relationship between the photo sensors and the light sources and estimate the light source emitted from each of the light sources. Such a complicated process in turn increases the circuit cost.

Alternatively, a plenty of photo sensors are required and increase of the number of photo sensors increases the production cost. Moreover, when using light sources of multi-primary colors such as LED for each of the RGB, it is necessary to arrange a color filter for the photo sensor and detect the light of each color, which also increases the production cost.

Moreover, in the compensation technique using the temperature sensor, when a plenty of LEDs are arranged on a large-area surface such as a large-size television, a temperature distribution is caused in the plane due to thermal convection and heat discharge structure. Accordingly, it is actually difficult to detect the temperatures of all the LEDs in the plane by a single temperature sensor and a plenty of temperature sensors are required, which increases the production cost.

SUMMARY OF THE INVENTION

It is therefore an object of the present invention to provide a technique for not causing brightness fluctuations by a temperature change and not causing brightness in-plane irregularities even if a temperature distribution is generated in the plane.

In order to achieve the aforementioned object, the present invention provides a lighting device comprising: at least one line connected in parallel, a constant voltage source for applying a constant voltage to the line, an ON/OFF controller, and a current detector for measuring a value of current flowing in the line, wherein the line is formed by one or more light-emitting diodes and a switch for turning ON/OFF the current flowing in the light emitting diodes connected in series, and according to the current value of each of the lines measured by the current detector, the ON/OFF controller controls the ON/OFF period of the switch of each of the lines.

Moreover, the present invention provides a lighting device in which a constant current source is used instead of the constant voltage source and a voltage detector is used instead of the current detector.

Furthermore, a liquid crystal display device using these lighting devices is provided.

The present invention can provide a lighting device whose brightness is not changed by a temperature change so as to output stable luminance. Furthermore, the present invention can realize an LED lighting device in which no in-plane brightness irregularities are caused by a temperature distribution even if the temperature distribution is generated in the plane.

Other objects, features and advantages of the invention will become apparent from the following description of the embodiments of the invention taken in conjunction with the accompanying drawings.

DETAILED DESCRIPTION OF EMBODIMENTS

Figure 18:
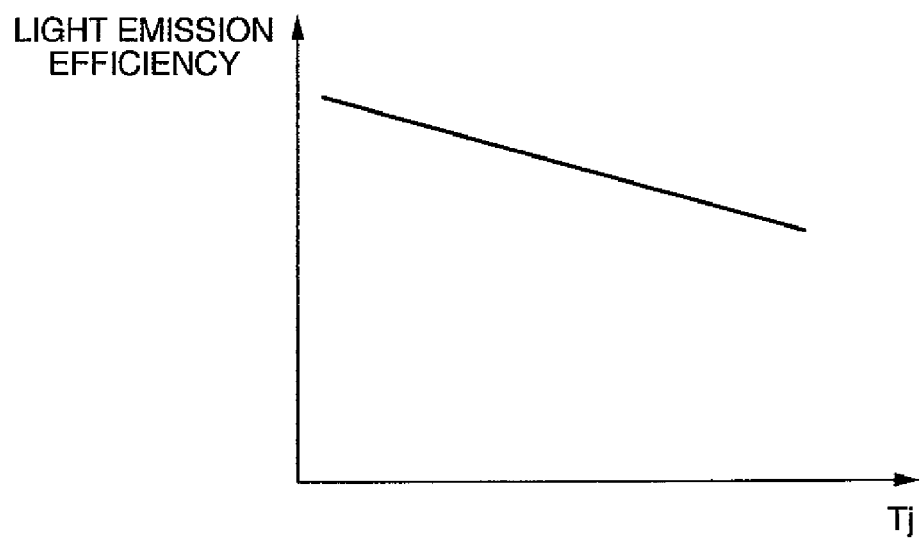
FIG. 18 shows the relationship between the LED efficiency and the junction temperature.

As has been described above, the LED has a characteristic that its light emission efficiency is changed by the temperature. FIG. 18 is a graph showing the relationship between the light emission efficiency and the temperature (Tj) of the light emission portion of the LED. When the temperature of the light emission portion increases, the light emission efficiency is lowered. Accordingly, when a constant power is supplied to the LED, the emitted light quantity is lowered by the temperature increase by the self-heating. In order to maintain a certain emitted light quantity against a temperature fluctuation, it is necessary to change the power supplied to the LED at each moment. For this, it is necessary to know the light emission efficiency of the LED at each moment.

Figure 19:
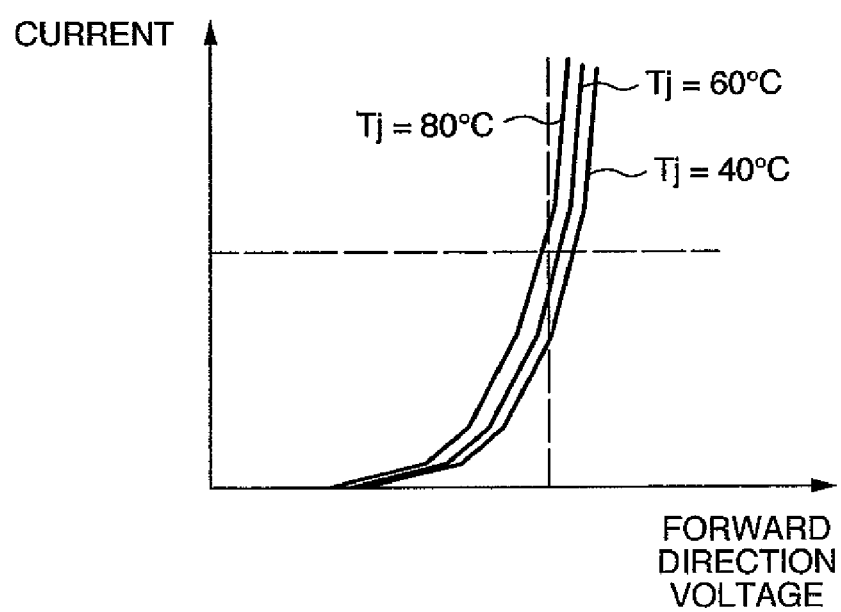
FIG. 19 shows voltage and current characteristics for the junction temperature.

FIG. 19 is a graph showing an example of Tj dependence of current characteristic with respect to the LED forward direction voltage. In FIG. 19, when a constant voltage is applied, the Tj increases together with the current. That is, by applying a constant voltage to the LED and detecting the current flow, it is possible to know the Tj from the graph of FIG. 19. When the Tj is known, it is possible to know the light emission efficiency from FIG. 18. Accordingly, it is possible to supply a power corresponding to the light emission efficiency at each moment. The supplied power can be changed by adjusting the application time under a constant voltage applied.

Moreover, as is clear from FIG. 19, when a constant current is applied, as the Tj increases, the voltage is lowered. Accordingly, when a constant current is applied, it is possible to know the Tj similarly by measuring the voltage applied.

The present invention was made by noting that the Tj can be indirectly measured by measuring the electric characteristic of the LED as has been described above. By using this method, it is possible to estimate the light emission efficiency of the LED not depending on the difference in the physical position of the detector with respect to the LED. Accordingly, it is possible to provide a lighting device which can be appropriately employed for a large-screen liquid crystal display device.

Hereinafter, explanation will be given on specific embodiments of the present invention.

Embodiment 1

Detailed explanation will be given on the first embodiment of the present invention with reference to FIGS. 1 to 8.

Figure 1:
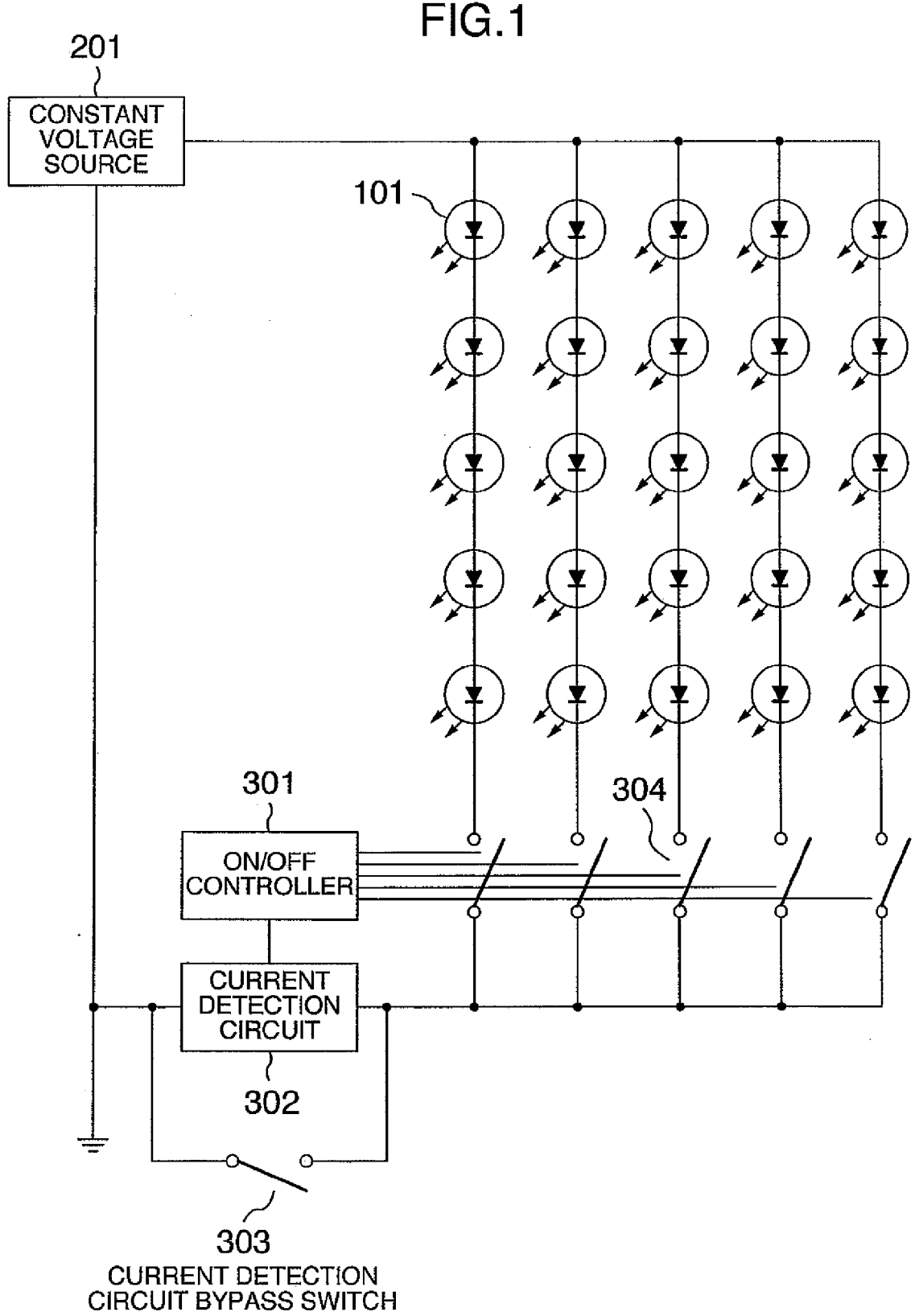
FIG. 1 shows a configuration of the present invention.

FIG. 1 shows a concept of a circuit configuration according to the present embodiment. The present embodiment uses five lines, each including five LEDs 101 connected in series and a switch 304 connected in series to the LEDs. The five lines are connected in parallel and each line is driven by a constant voltage source 201.

A current detector 302 and a bypass switch 303 are arranged at a portion where currents of all the lines are concentrated. With this configuration, it is possible to measure the current values of all the lines by the single current detector 302. That is, only the switch 304 of the line whose current value is to be detected is turned ON and the current flow is measured by the current detector 302. Thus, it is possible to measure a current value of each line.

Moreover, when no current is to be measured, the bypass switch 303 is turned ON so that no current is fed to the current detector 302. An ON/OFF controller 301 adjusts the ON/OFF period of the switch 304 of each line according to the current value of the line detected, thereby compensating the brightness fluctuation caused by the temperature change.

Figure 2:
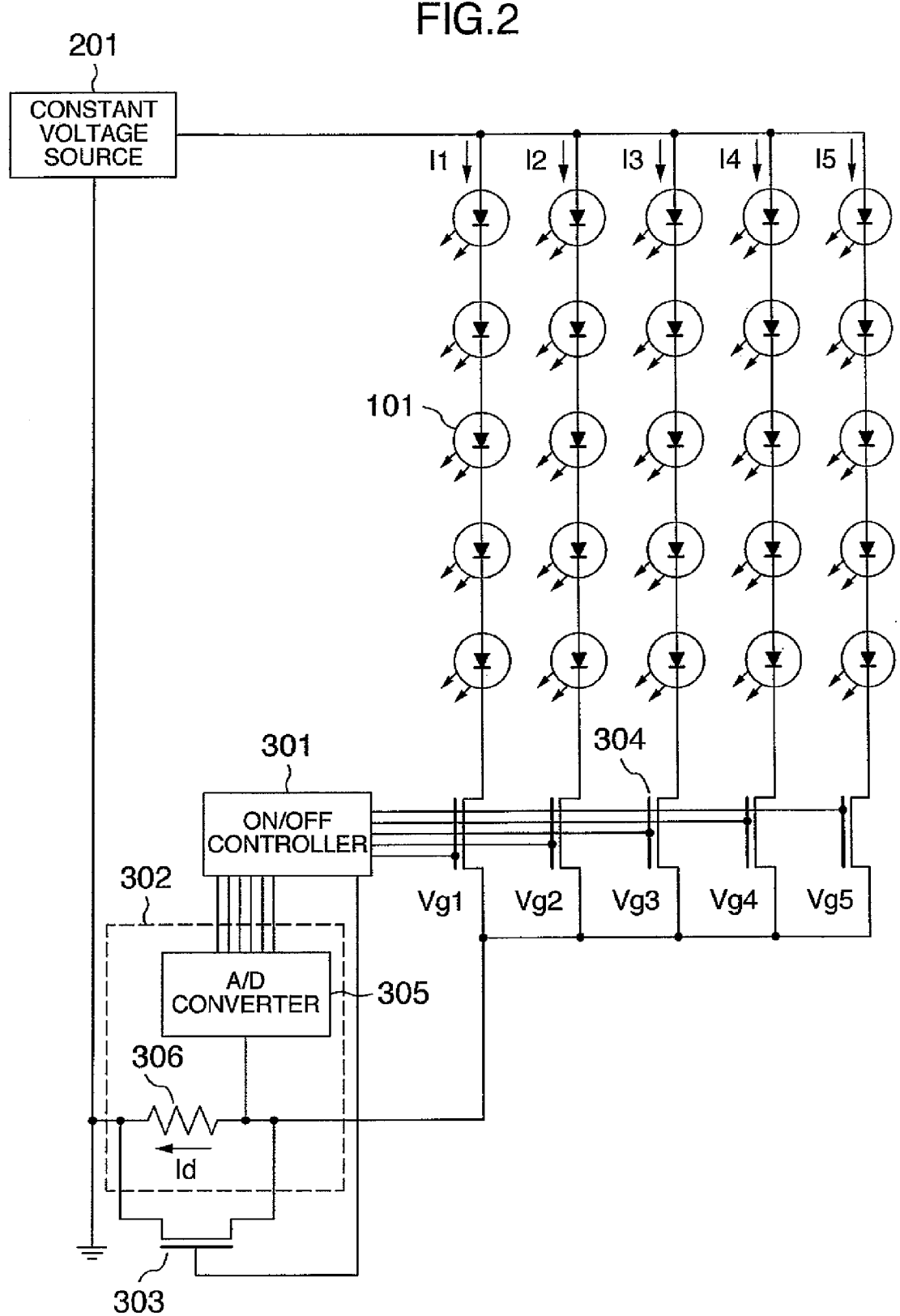
FIG. 2 explains an example of a circuit configuration of the present invention.

FIG. 2 shows a configuration of the present embodiment through a specific circuit diagram. The switch 304 of each line may be a semiconductor switch such as a MOS transistor or a bipolar transistor. In this embodiment, the MOS transistor is used as the switch 304 of each line.

The current detector 302 is formed by a highly accurate resistor 306 and an A/D converter 305. That is, by measuring a voltage drop in the resistor 306 caused by current flow, it is possible to calculate the current value by the Ohm's law. It should be noted that in this embodiment, the voltage drop of the resistor 306 is converted into a digital signal by the A/D converter 305 and transmitted to the ON/OFF controller 301. Moreover, the bypass switch 303 may be formed similarly by a semiconductor switch.

Figure 3:
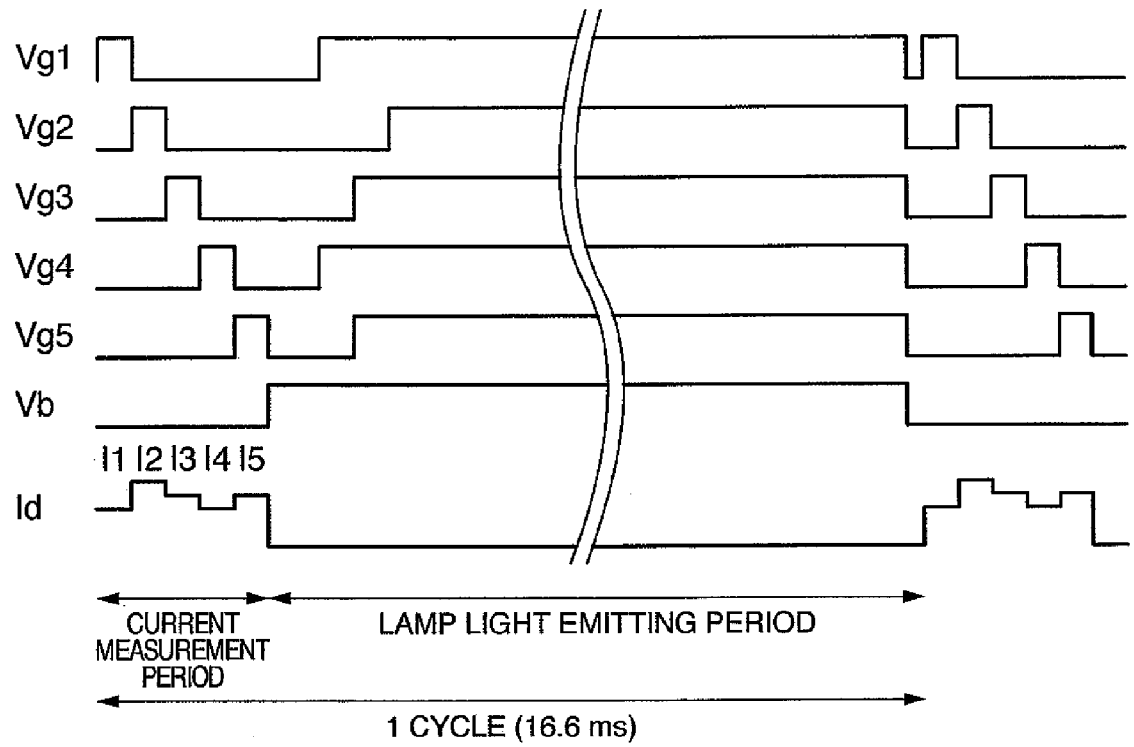
FIG. 3 explains a drive sequence of the present invention.

Hereinafter, explanation will be given on the operation of the circuit shown in FIG. 2 by using FIG. 3. FIG. 3 shows a drive sequence of the circuit of FIG. 2. In this embodiment, the drive sequence is divided into a current detection period and a lamp lighting period. The current detection period is a period for detecting a current value of each line. The lamp lighting period is a period for causing the lamp to turn ON to emit light. The current detection period and the lamp lighting period constitute one cycle, which is repeated at 60 Hz (about 16.6-millisecond cycle). This disables human eyes to know that the light sources of each line are turned ON intermittently. When the frequency is lower than 60 Hz, the human eyes feel that the light sources are blinking.

Moreover, the current detection period is set to 100 microseconds. As will be detailed later, during the current detection period, current is supplied to each line in time division way and the current value is measured. If this period is long, the human eyes can catch that only one line is lit. Accordingly, current is supplied for only an extremely short time to measure the current value so that human eyes cannot feel that only one line is lit.

The time required for measuring the current value of each line may be a time for stabilizing the circuit time constant, i.e., current plus a time required for converting the analog signal into a digital signal by the A/D converter. That is, several tens of microseconds are sufficient. In this embodiment, current of each line is measured during 20 microseconds. Accordingly, the current measurement period for measuring the current of the five lines was 100 microseconds.

As shown in FIG. 3, during the current measurement period, Vg1 to Vg5 are successively set to High voltage to turn ON the transistors. That is, during the current measurement period, each switch of at least one line is turned ON in time division way and current of each line is separately measured. The ON/OFF controller 301 has a built-in condition table 307 and calculates the efficiency of the LED 101 from the current value of each line so as to control the ON/OFF period ratio (light emission duty) of each line during the lamp lighting period, thereby compensating the fluctuation of the brightness. That is, the time average power is adjusted so that the product of the efficiency and the power supply is always constant to obtain a constant brightness all the time.

Figure 4:
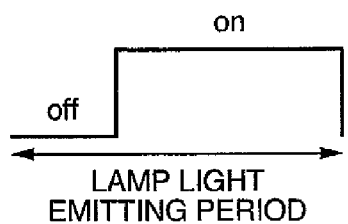
FIG. 4 explains a light emission duty.

It should be noted that as shown in FIG. 4, the light emission duty is the ON time ratio during the lamp lighting period.

During the lamp lighting period, Vb is set to high voltage to turn ON the bypass switch 303 and bypass the current. Thus, it is possible to prevent heating of the resistor 306 during the lamp lighting period.

Figure 5:
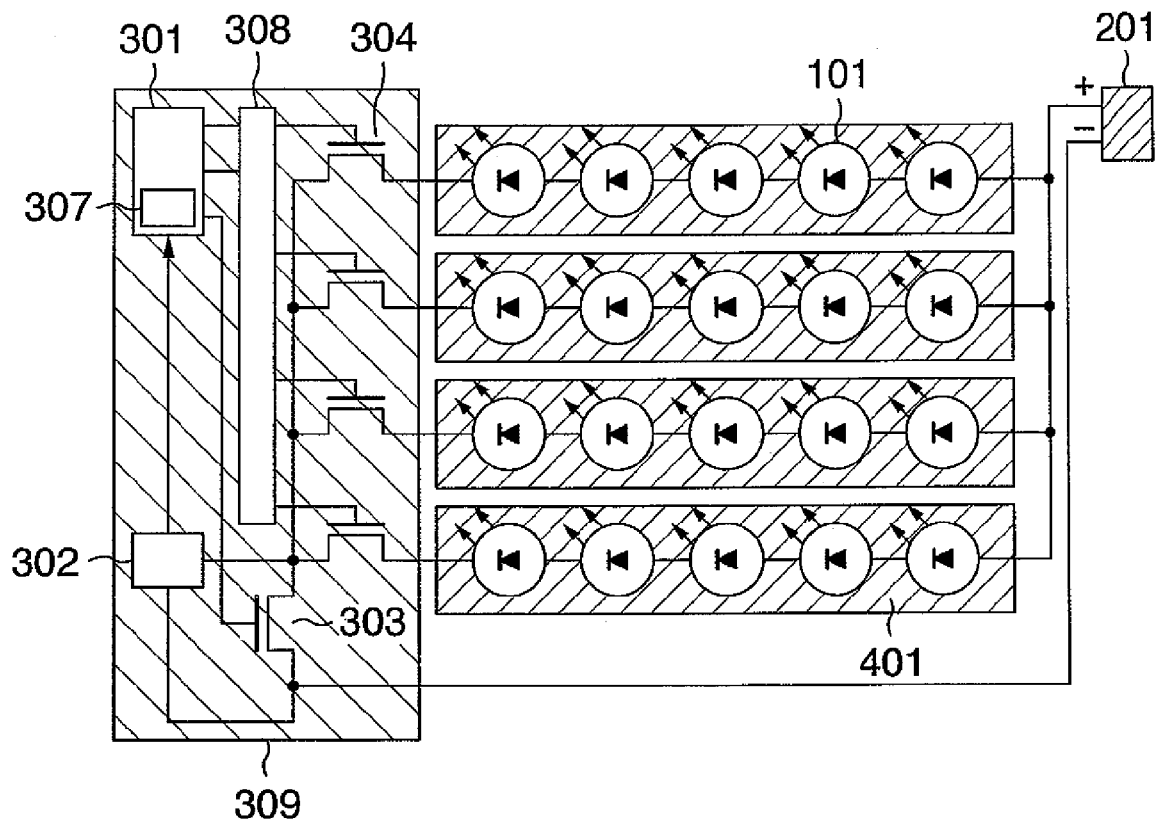
FIG. 5 shows a configuration of the present invention.

FIG. 5 shows the entire configuration of the present embodiment. The ON/OFF controller 301, the current detector 302, and the switches 304 of the respective lines are arranged on a control substrate 309. Moreover, the gate of the MOS switch 304 of each line is driven by a shift register 308. The ON/OFF controller 301 serially transmits the ON/OFF information on each line to the shift register 308. The shift register 308 parallel-converts the ON/OFF information so as to control ON/OFF of the switch 304 of each line. By using the shift register 308, it is possible to reduce the number of pins of the ON/OFF controller. This is advantageous when the number of lines is very large.

Figure 6:
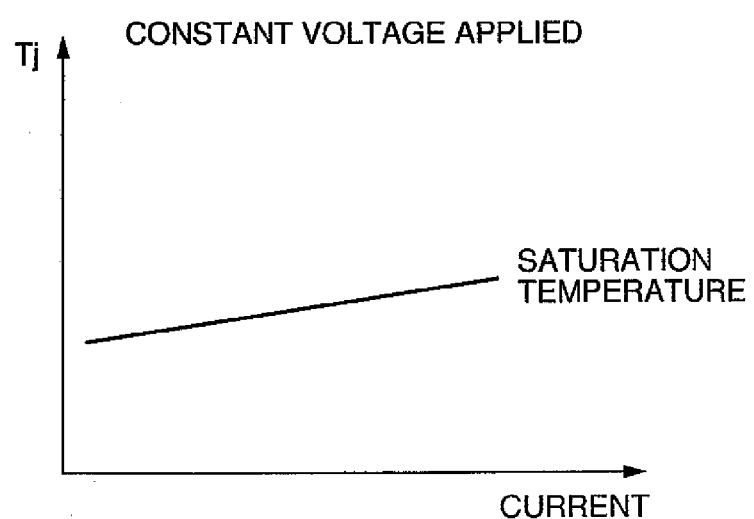
FIG. 6 shows a relationship between the LED junction temperature and current when a constant voltage is applied.
Figure 7:
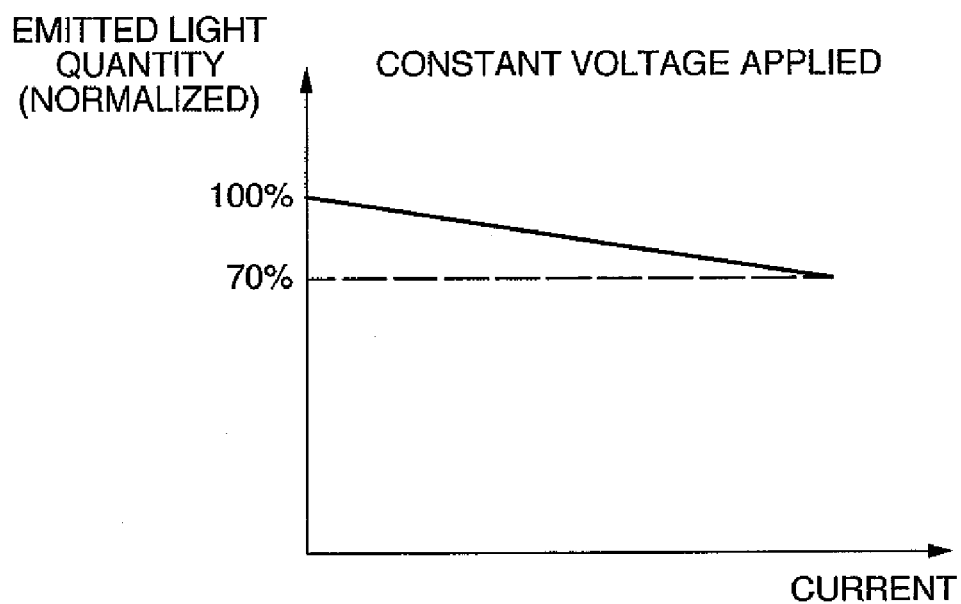
FIG. 7 shows a relationship between the LED current and the emitted light quantity when a constant voltage is applied.
Figure 8:
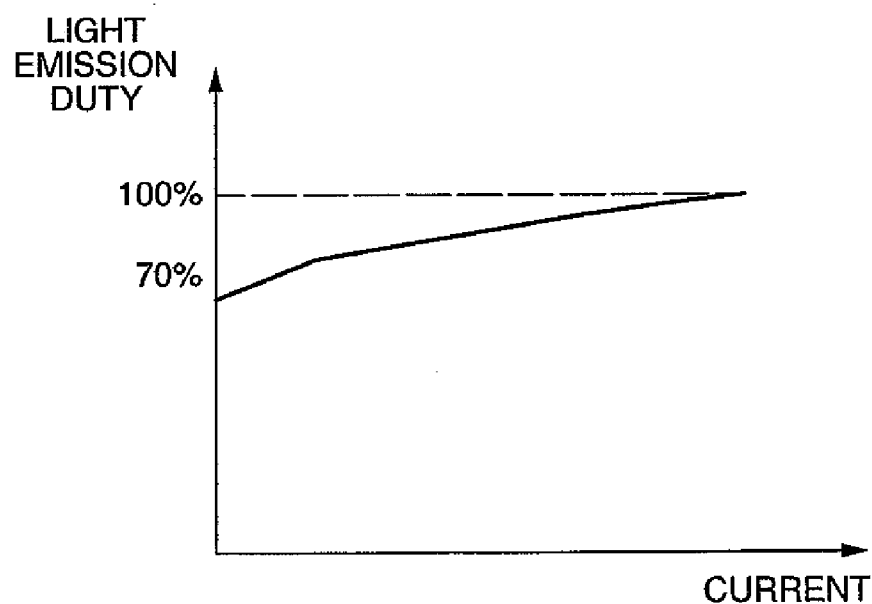
FIG. 8 shows the relationship of the measured current and light emission duty.

FIG. 6 shows the relationship between the temperature Tj of the light emission portion of the LED when a constant voltage is applied to the LED 101 used in this embodiment and the current flow. Moreover, FIG. 7 shows the emitted light quantity of the LED 101 at each current value similarly when a constant voltage is applied. As is clear from FIG. 6 and FIG. 7, the current value becomes maximum and the emitted light quantity becomes minimum when the Tj has reached the saturation temperature. The condition table can be created from FIG. 7. That is, since the brightness is proportional to the product of the emitted light quantity and the light emission duty, the light emission duty at each current value is set so that the light emission duty is maximum at the current value when the emitted light quantity becomes minimum and the light emission duty is minimum at the current value when the emitted light quantity becomes maximum, thereby preventing fluctuation of brightness. FIG. 8 shows a condition table when the maximum light emission duty is set to 100%.

Here, explanation will be given on the method how to set the condition table 307 with reference to FIG. 6, FIG. 7, and FIG. 8. The junction temperature of the LED 101 gradually increases after lighting and is saturated at a certain temperature.

FIG. 6 shows the relationship between the temperature Tj of the light emitting portion of the LED when a constant voltage is applied to the LED 101 and the current which has flown. Moreover, FIG. 7 shows the emitted light quantity of the LED 101 at each current value when a constant voltage is applied. As is clear from FIG. 6 and FIG. 7, when the Tj has reached the saturation temperature, the current value is maximum and the emitted light quantity is minimum. The condition table 307 can be created from FIG. 7. That is, the brightness is proportional to a product of the emitted light quantity and the light emission duty. Accordingly, the light emission duty at each current value is set so that the light emission duty is maximum at the current value when the emitted light quantity is minimum and the light emission duty is minimum at the current value when the emitted light quantity is maximum, thereby preventing brightness fluctuation. FIG. 8 shows a condition table when the maximum light emission duty is set to 100%.

On the contrary, there is an LED whose efficiency is lowered as the junction temperature increases but the emitted light quantity increases because the current increases. When using such an LED, control is performed to lower the light emission duty when the current is large and increase the light emission duty when the current is small.

Embodiment 2

Explanation will be given on the second embodiment of the present invention.

Figure 9:
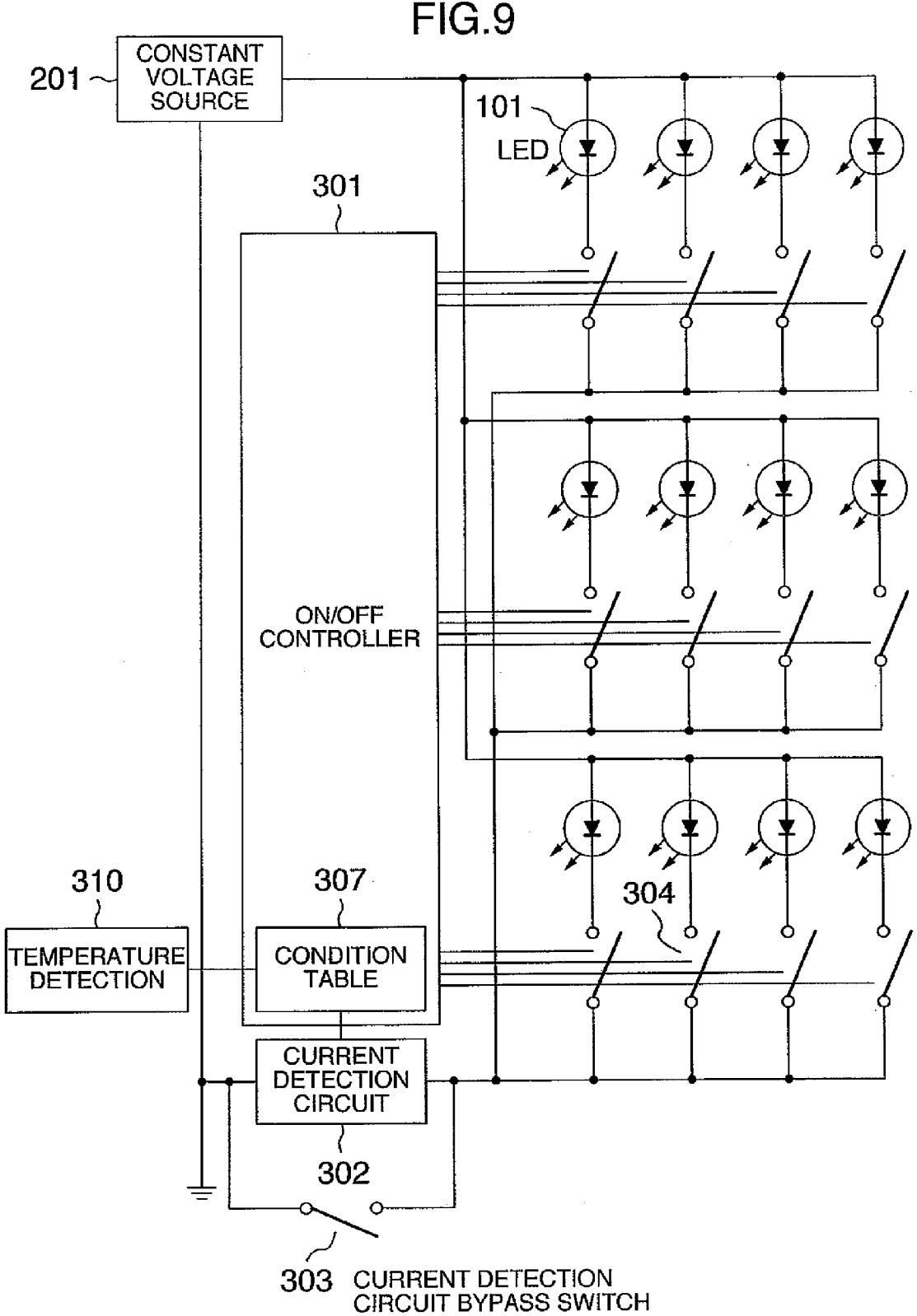
FIG. 9 shows a circuit configuration of the present invention.

The explanation will be given by referring to FIG. 9.

The present embodiment shows 12 lines connected in parallel. Each of the lines is connected to an LED 101 and a switch 304 in series. These lines are driven by a constant voltage source 201. The switch 304 of each line is controlled to be ON/OFF by an ON/OFF controller 301. Moreover, the current detector 302 and the bypass switch 303 are arranged in parallel at a position where currents of all the lines are concentrated.

Furthermore, temperature detection means 310 is provided. A condition table 307 built in the ON/OFF controller 301 decides the ON/OFF period of each line according to the current value of each line and the detection result of the temperature detection means 310.

By detecting the current of each line, it is possible to adjust the ON/OFF period ratio of each line to compensate the brightness fluctuation in the same way as has been described in the first embodiment.

The LED junction temperature gradually increases immediately after lighting and the temperature is saturated when the heating amount of the LED itself is balanced with the heat release of the substrate 401 on which the LED is mounted. However, the saturation is also affected by the ambient temperature where the light device is placed. That is, the saturation temperature differs depending on the temperature of the environment in which the lighting device is placed.

In this invention, the duty at each junction temperature is set according to the efficiency of the LED 101 in the junction saturation temperature. Accordingly, by measuring the environment temperature, it is possible to predict the saturation temperature. Consequently, it is possible to set an optimal light emission duty according to various environment temperatures.

The temperature detection means 310 may be arranged in an environment where the lighting device is placed such as a place for measuring the indoor temperature or at the back side of a radiation plate where the LED 101 is mounted. By checking the correlation between the temperature of the place where the temperature detection means 310 is arranged and the saturation temperature of the Tj in advance, it is possible to predict the Tj saturation temperature.

Embodiment 3

Explanation will be given on the third embodiment of the present invention with reference to FIG. 10 and FIG. 11.

Figure 10:
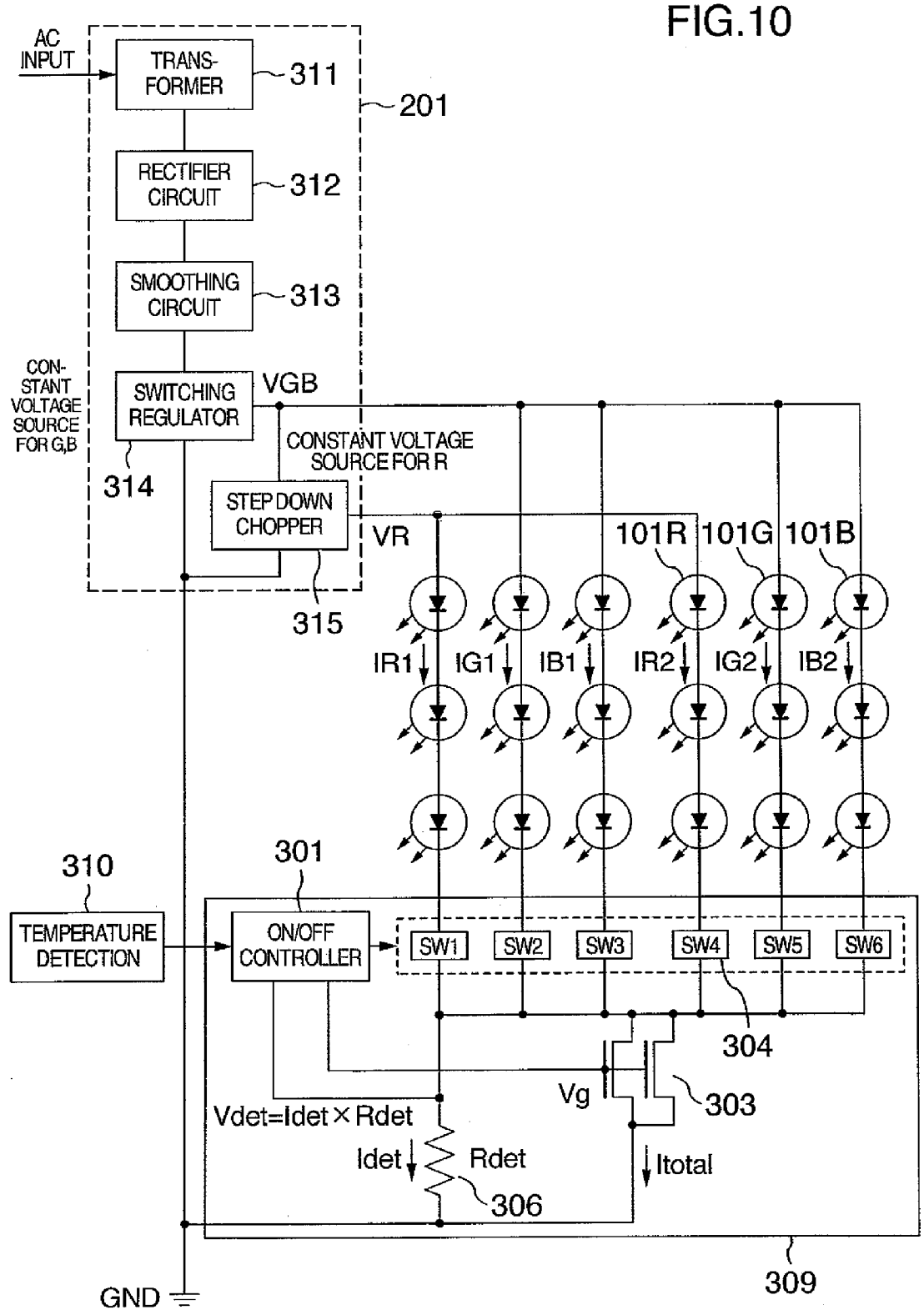
FIG. 10 explains an example of the circuit configuration of the present invention.

FIG. 10 shows a circuit configuration of the present embodiment. The AC power input is amplified by a transformer 311 and subjected to a rectifier circuit 312 and a smoothing circuit 313 so as to generate a constant voltage. The voltage is adjusted by a switching regulator 314 and used as a constant voltage source 201 of green (G) and blue (B). The G and B voltages are reduced by a step down chopper and the voltage is used as a constant voltage source 201 of red (R). Thus, a plurality of primary colors share the constant voltage source 201, thereby reducing the power cost.

In this embodiment, three LEDs are connected in series for each of the primary colors and the switch 304 is connected in series in each line. Moreover, two lines are connected in parallel for each of the primary colors.

The low potential side of each line is commonly connected and a current detection resistor 306 is connected between the potential point and the circuit reference potential (GND). The current detection resistor 306 is connected to the bypass switch 303 in parallel.

With this configuration, it is possible to measure current of each line by one current measuring means. Even when LEDs 101 of a plurality of primary colors are used, it is possible to perform measurement by one current detector 302.

Figure 11:
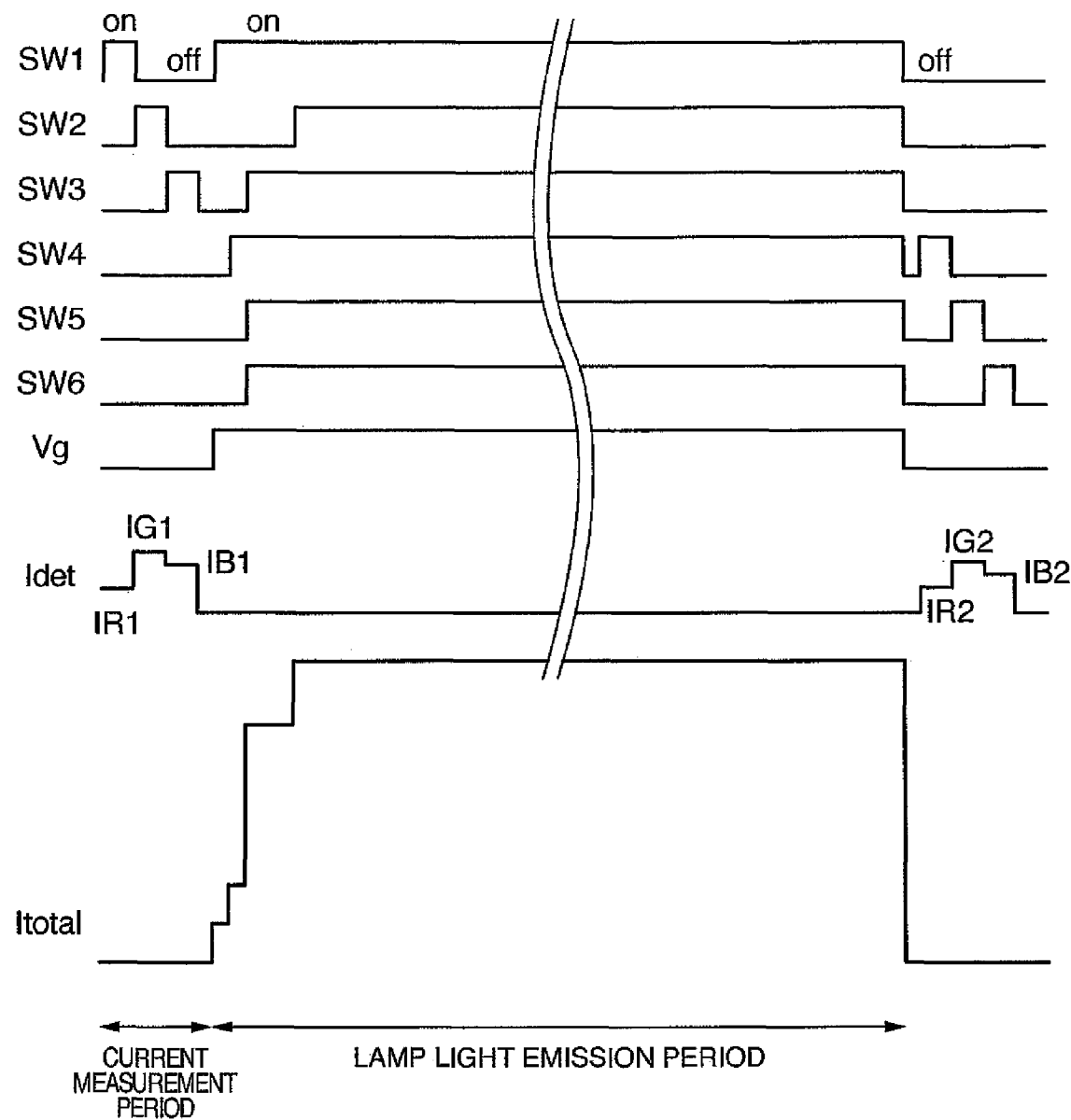
FIG. 11 shows a drive sequence of the present invention.

FIG. 11 shows a drive sequence in the present embodiment. Here, SW1 to SW6 show the ON/OFF state of the switch 304 of each line. The switch 304 is turned ON when the voltage becomes high and turned OFF when the voltage becomes low. Moreover, Idet represents a current detected by the current detector 302. Itotal represents a current flowing in the bypass switch 303.

In this embodiment, during the current detection period, the switches 304 of line 1 to line 3 are turned ON to measure the current value of each line and the light emission duty during the lamp light emission period is decided according to the measured current value. Moreover, during the next current detection period, the switches 304 of line 4 to line 6 are successively turned ON to measure the current value of each line. Thus, the lines measured during the current detection period may be freely selected. For example, it is possible to measure one line during one cycle.

As shown by Itotal in FIG. 11, during the lamp light emission period, a large current flows in the bypass switch 303. Accordingly, it is necessary to lower the voltage drop generated by the current flow in the bypass switch 303 to a degree which can be ignored as compared to the drive voltage of the LED 101. For this, the ON resistance of the bypass switch 303 should be very low. In this embodiment, the bypass switch 303 is realized by MOS transistors. In order to reduce the ON resistance, two MOS transistors are connected in parallel. This suppresses the heating by the detection resistor 306 during lamp light emission period and reduces the voltage drop of the bypass switch 303.

Embodiment 4

Explanation will be given on the fourth embodiment with reference to FIG. 12 to FIG. 15.

Figure 12:
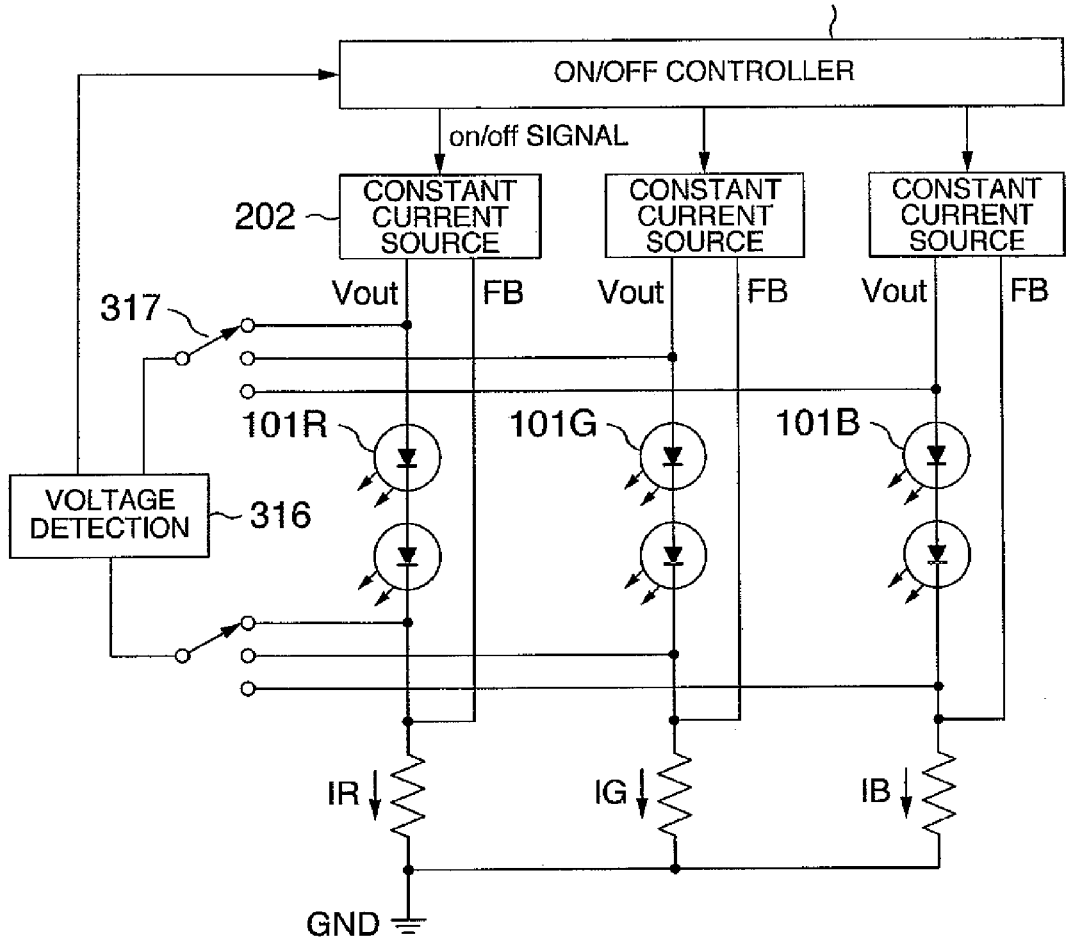
FIG. 12 shows an example of circuit configuration of the present invention.

FIG. 12 shows a circuit configuration of the present embodiment.

In this embodiment, each line which has two LEDs 101 of RGB connected in series and also a resistor are driven by a constant current source 202. The constant current source 202 feeds back voltage applied to the resistor of each line and changes the output voltage so that the current is always constant. That is, a constant current flows in each line.

Moreover, the constant current source 202 has a built-in switch for performing current ON/OFF control. In this embodiment, the junction temperature is recognized by measuring the voltage applied to the LED 101 when a constant current is fed to each line. By making the light emission duty based on each temperature, it is possible to compensate brightness fluctuation caused by a temperature change.

Figure 13:
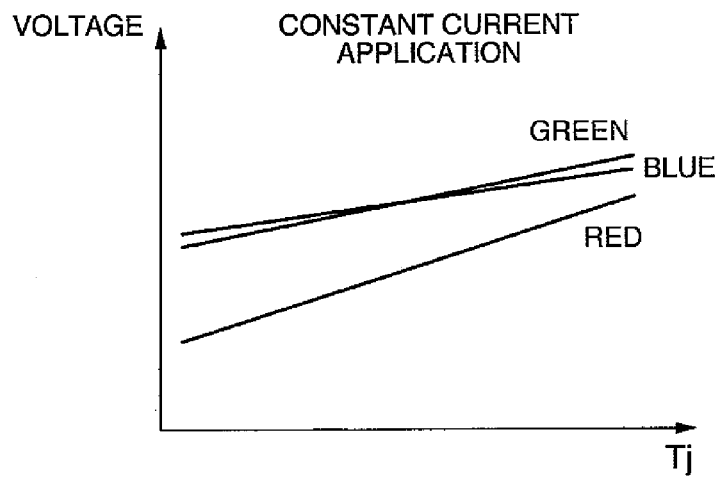
FIG. 13 shows the relationship between the LED junction temperature and voltage when a constant current flows.
Figure 14:
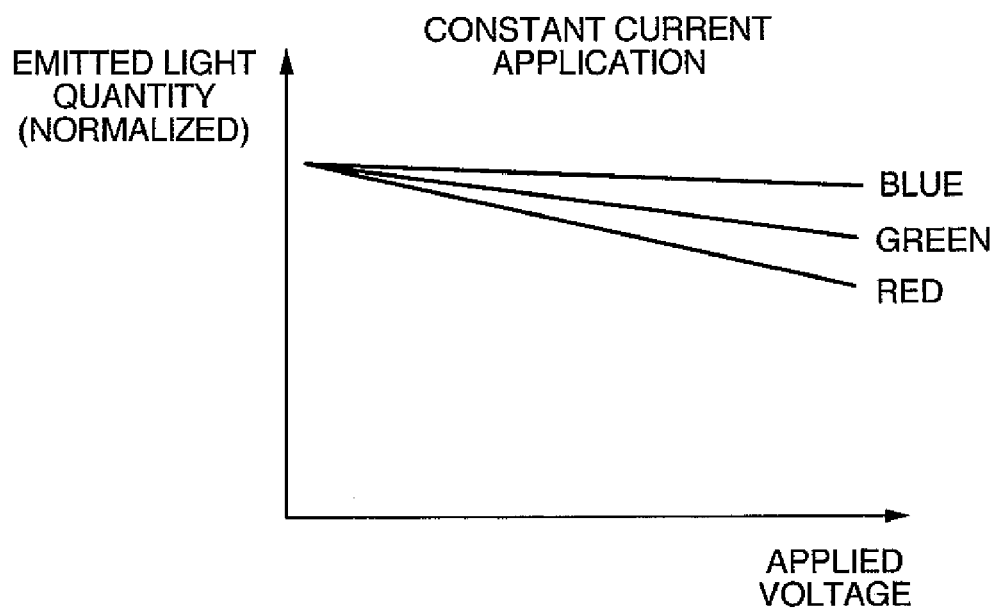
FIG. 14 shows the relationship between the LED voltage and the emitted light quantity when a constant current flows.
Figure 15:
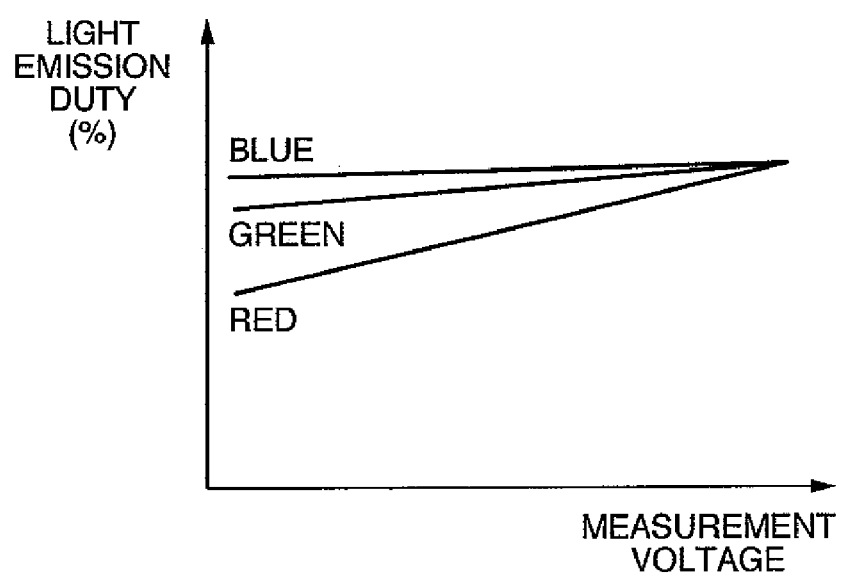
FIG. 15 shows the relationship between the measured voltage and light emission duty.

FIG. 13 shows the relationships between voltages applied to the respective LEDs 101 of R, G, B and Tj. Moreover, FIG. 14 shows the relationships between the voltages and the emitted light quantity (normalized value). For this, a condition table 307 changing the light emission duty for the measured voltages is created to suppress the brightness fluctuation.

Moreover, a voltage selector 317 is provided to switch the voltage applied to the LED 101 of each line so that a single voltage detector 316 can measure voltage applied to the LEDs 101 of all the lines. Thus, it is possible to measure LEDs of a plurality of lines and of a plurality of primary colors by using the single voltage detector 316.

Embodiment 5

Explanation will be given on the fifth embodiment of the present invention with reference to FIG. 16 and FIG. 17.

Figure 16:
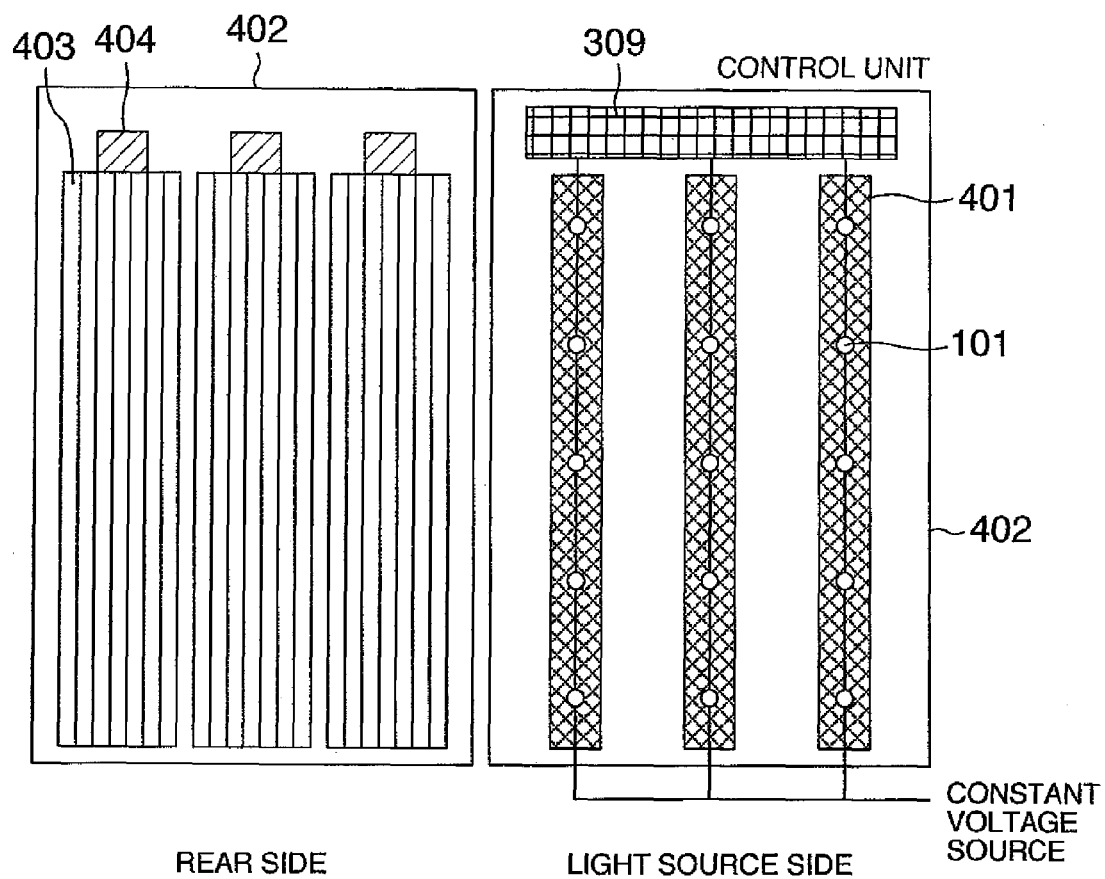
FIG. 16 explains a configuration of the present invention.
Figure 17:
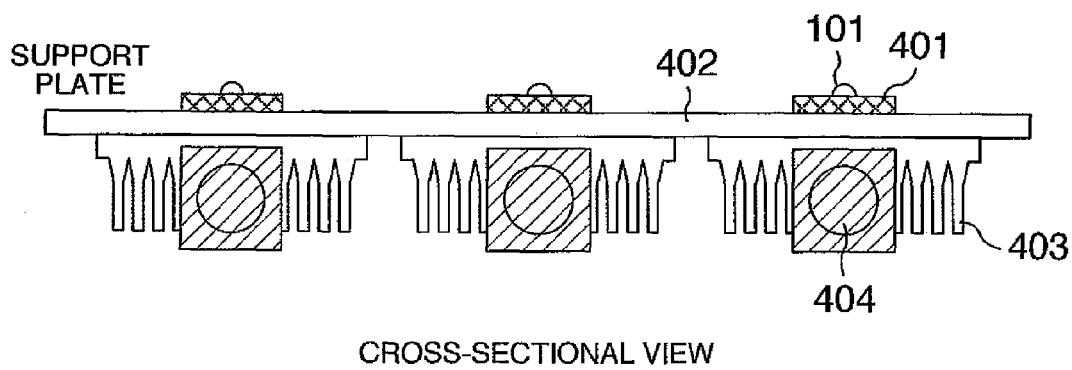
FIG. 17 explains a configuration of the present invention.

FIG. 16 is a plan view of a configuration of the lighting device of the present embodiment. The LEDs 101 are mounted on a metal substrate 401. The metal substrate 401 is mounted on a radiation plate 402. Moreover, on the rear side of the surface where the substrate 401 having the LED 101s 101 is mounted, a plurality of radiation fins 403 and air cooling fans 404. FIG. 17 is a cross sectional view of the configuration of FIG. 16.

The radiation fins 403 are arranged in parallel to the substrate 401 and the longitudinal axis direction of the protruding portion is arranged to be parallel to the substrate 401. The air cooling fans are arranged so as to send an air flow in that direction.

The LEDs 101 are driven by the constant voltage source 201. The control unit 309 includes a current detector 302 and an ON/OFF controller 301 similar to those described in the first embodiment are provided.

In this embodiment, according to the current value of each line detected by the current detector 302, i.e., the junction temperature information on the LEDs, the air cooling fans 404 are separately driven. That is, when the junction temperature exceeds a set temperature, the air cooling fan 404 immediately below the line is driven. Thus, it is possible to selectively cool the line which has exceeded the set temperature. That is, the air cooling fan 404 is driven only when required and it is possible to reduce the power consumption of the air cooling fan 404.

Embodiment 6

Explanation will be given on the sixth embodiment with reference to FIG. 20.

Figure 20:
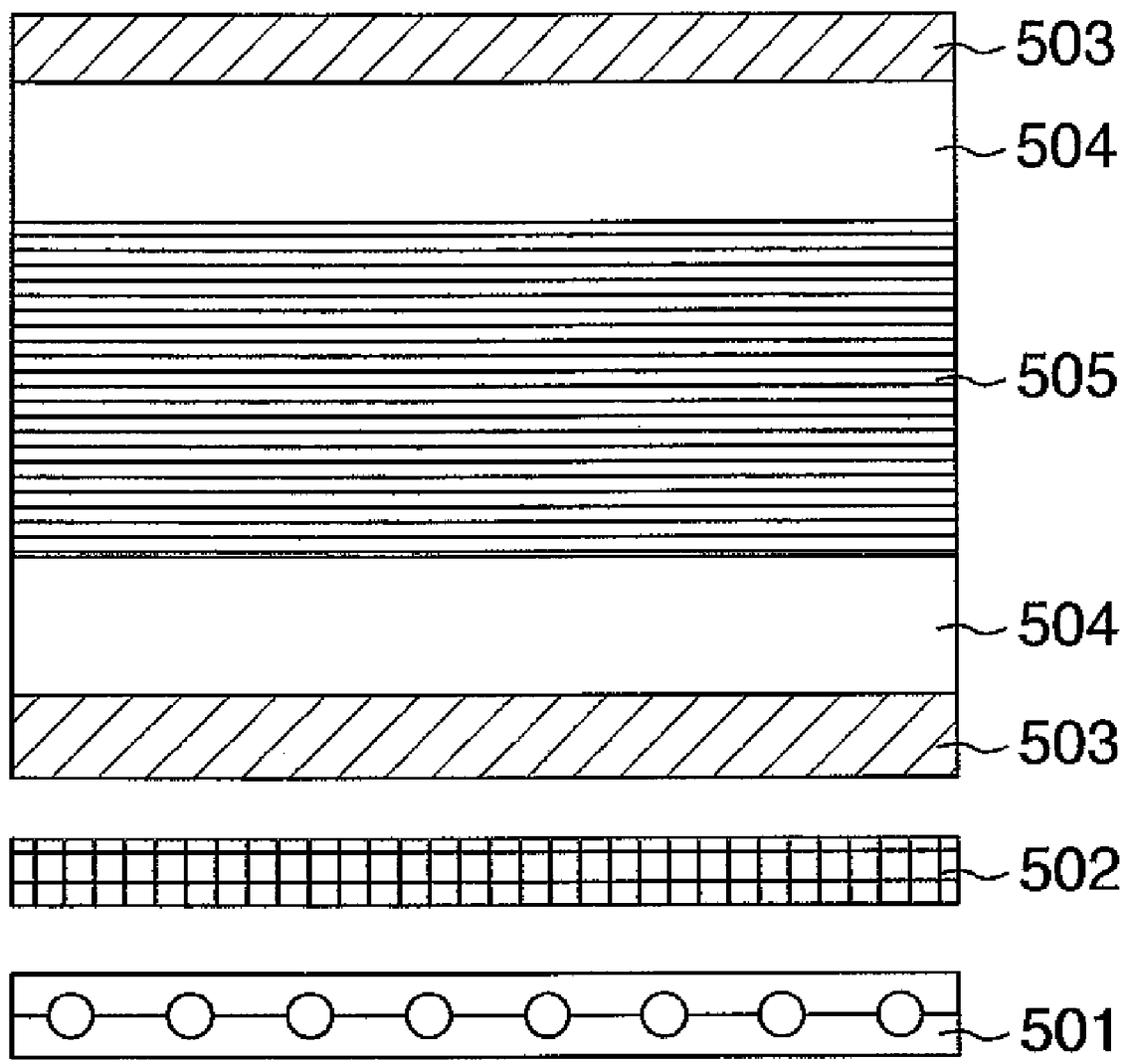
FIG. 20 shows a liquid crystal display device.

FIG. 20 shows a configuration using the lighting device explained through the aforementioned embodiments 1 to 5 as a light source of the liquid crystal display device. The lighting device is used as a light source 501 which supplies light to a liquid crystal panel having a pair of polarization panels 503, a pair of substrates 504, and a liquid crystal layer 505 sandwiched by them.

By using the present invention as a light source, it is possible to realize a liquid crystal display device improving the brightness stability and eliminating fluctuation caused by the temperature distribution.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A lighting device comprising:
   at least two lines connected in parallel,
   a constant current source for a in a constant current to at least one of the at least two lines,
   an ON/OFF controller, and
   a voltage detector for measuring a value of voltage flowing in each line of the at least two lines,
   wherein
   each line of the at least two lines is formed by one or more light-emitting diodes and a switch for turning ON/OFF the current flowing in the light-emitting diodes connected in series and
   according to the voltage value of each line of the at least two lines measured by the voltage detector, the ON/OFF controller controls a duty ratio of the one or more light-emitting diodes of each line in accordance with the voltage measured,
   further comprising a selector for selectively outputting a voltage value of each line of the at least two lines to the voltage detector.

2. A liquid crystal display device comprising:
   a liquid crystal panel having a pair of glass substrates, a pair of polarizing plates, and a liquid crystal layer sandwiched by the substrates, and the lighting device disclosed in claim 1 for supplying light to the liquid crystal panel.

3. A lighting device according to claim 1, wherein the constant current source compensates the brightness fluctuation of one or more light emitting diodes according to the temperature change.

4. A lighting device comprising:
   at least two lines connected in parallel
   a constant current source for applying a constant current to at least one of the at least two lines,
   an ON/OFF controller, and
   a voltage detector for measuring a value of voltage flowing in each line of the at least two lines,
   wherein
   each line of the at least two lines is formed by one or more light-emitting diodes and a switch for turning ON/OFF the current flowing in the light-emitting diodes connected in series, and
   according to the voltage value of each line of the at least two lines measured by the voltage detector, the ON/OFF controller controls a duty ratio of the one or more light-emitting diodes of each line in accordance with the voltage measured,
   further comprising temperature measuring means, and
   a condition table for deciding the ON/OFF period ratio according to a signal from the temperature measuring means and the voltage detector,
   wherein the ON/OFF controller controls the ON/OFF period according to the condition table.

5. The lighting device as claimed in claim 4, wherein the temperature measuring means measures a temperature of the air in a vicinity of the lighting device or a temperature of the metal plate connected to the light emitting diode.

6. A lighting device comprising:
   at least two lines connected in parallel,
   a constant current source for applying a constant current to at least one of the at least two lines,
   an ON/OFF controller, and
   a voltage detector for measuring a value of voltage flowing in each line of the at least two lines,
   wherein
   each line of the at least two lines is formed by one or more light-emitting diodes and a switch for turning ON/OFF the current flowing in the light-emitting diodes connected in series, and
   according to the voltage value of each line of the at least two lines measured b the voltage detector, the ON/OFF controller controls a duty ratio of the one or more light-emitting diodes of each line in accordance with the voltage measured,
   further comprising one or more cooling fans, wherein the one or more cooling fans are driven separately according to the voltage value of each line of the at least two lines measured by the voltage detector.

* * * * *